(12) United States Patent
Chen

(10) Patent No.: US 8,977,224 B2
(45) Date of Patent: Mar. 10, 2015

(54) TRANSCEIVER AND NOISE CANCELLATION METHOD FOR RADIO-FREQUENCY IDENTIFICATION

(75) Inventor: Shou-Fang Chen, Hsinchu County (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 165 days.

(21) Appl. No.: 13/570,295

(22) Filed: Aug. 9, 2012

(65) Prior Publication Data

US 2014/0045441 A1 Feb. 13, 2014

(51) Int. Cl.
*H04B 5/00* (2006.01)

(52) U.S. Cl.
CPC ........................................ *H04B 1/525* (2013.01)
USPC .......................................... 455/305; 455/296

(58) Field of Classification Search
USPC ........ 455/226.1, 296, 304, 305, 307; 375/346
See application file for complete search history.

(56) References Cited

U.S. PATENT DOCUMENTS

| 7,526,266 B2 | 4/2009 | Al-Mahdawi |
| 2002/0044058 A1 | 4/2002 | Heinrich et al. |

OTHER PUBLICATIONS

Taiwan Office Action dated Jun. 26, 2014, 4 pages.

*Primary Examiner* — Blane J Jackson
(74) *Attorney, Agent, or Firm* — Edell, Shapiro & Finnan, LLC

(57) ABSTRACT

A transceiver for radio-frequency identification (RFID) is provided. The transceiver includes a transmitter, a receiver and a noise canceller. The transmitter transmits a carrier signal to an antenna. The receiver receives a wireless signal from the antenna. The noise canceller generates a feedback current according to a part of the carrier signal, and feeds the feedback current to an input of the receiver to cancel noises in the wireless signal. Further, the noise canceller adjusts the feedback current according to the signal strength of the noises in the wireless signal.

13 Claims, 4 Drawing Sheets

TRANSCEIVER AND NOISE CANCELLATION METHOD FOR RADIO-FREQUENCY IDENTIFICATION

BACKGROUND OF THE INVENTION

1. Field of the Invention

The invention relates in general to a wireless communication system and associated method, and more particularly to a transceiver and a noise cancellation method for radio-frequency identification (RFID).

2. Description of the Related Art

RFID is considered as one of top ten most influential techniques in the twenty-first century. Referring to FIG. 1, an RFID system generally requires a reader and an RFID tag. In an RFID operation, an RF electric wave is transmitted by the reader 10 to trigger the RFID tag 12 within coverage, and an electric current is generated through electromagnetic sensing to power a chip on the RFID tag 12 and to backscatter a wireless signal to the reader 10. Based on driving energy, RFID tags are categorized into active and passive types. A passive tag is not equipped with a battery and is powered by electric energy generated through electromagnetic sensing the RF electric wave of the reader, inferring that the passive tag only passively backscatters to a reader upon receiving a signal transmitted by the reader. In contrast, an active tag is equipped with a battery, and is thus capable of transmitting a signal to be read by a reader and has a transmission range broader than that of a passive tag.

The RFID tag 12 usually transmits a message via a modulated carrier signal when backscattering to the reader 10; however the reader 10 at this point still transmits unmodulated carrier signals for powering the passive tag. FIG. 2 shows a structure in the reader 10. Majority of a carrier signal Cx sent by the transmitter 14 is transmitted to the environment. Due to slight impedance mismatch in real situations, a small part of the carrier signal Cx is reflected by the antenna 18, as indicated by a reflected carrier signal CRx in FIG. 2. The reflected carrier signal CRx and a wireless signal Rx received by the antenna 18 are jointly received by the receiver 16 via a coupler 20. Compared to the desired wireless signal Rx, the reflected carrier signal CRx is equivalently noises that should be restrained or eliminated.

FIG. 3 shows a spectrum of the reflected carrier signal CRx and the wireless signal Rx. It is extremely difficult for the reader 10 to send an absolutely clean (monotone) carrier signal Cx, as the carrier signal Cx more or less contains a phase noise. Therefore, the spectrum of the reflected carrier signal CRx is spread regarding a carrier frequency $f_{Cx}$ as a center. In a modulated result, the wireless signal Rx is substantially consisted of two tones (having frequencies of subtracting/adding a frequency difference $\Delta f$ from/to the carrier frequency $f_{Cx}$ of the carrier signal Cx), as shown in FIG. 3. The presence of the reflected carrier signal CRx reduces a signal-to-noise ratio of the receiver 16 at a receiving terminal. Referring to FIG. 3, once the reflected carrier signal CRx is aggravated, the wireless signal Rx may be overwhelmed by the reflected carrier signal CRx and become unidentifiable.

Therefore, there is a need for a solution for eliminating or restraining the reflected carrier signal CRx. A most instinctive approach is to decrease the impedance mismatch to directly reduce the energy of the reflected carrier signal CRx. However, such approach requires high-precision impedance matching and thus significantly increases costs for manufacturing readers.

SUMMARY OF THE INVENTION

The invention is directed to a transceiver and noise cancellation for radio-frequency identification (RFID), which cancels noises in a wireless signal through a feedback current generated according to a part of a carrier signal.

According to one embodiment of the present invention, a transceiver for RFID is provided. The transceiver includes a transmitter, a receiver and a noise canceller. The transmitter transmits a carrier signal to an antenna. The receiver receives a wireless signal from the antenna. The noise canceller generates a feedback current according to a part of the carrier signal, and feeds the feedback current to an input of the receiver to cancel noises in the wireless signal. Further, the noise canceller adjusts the feedback current according to the signal strength of the noises in the wireless signal.

According to another embodiment of the present invention, a noise cancellation method applied to an RFID transceiver is provided. The method includes steps of: transmitting a carrier signal to an antenna; receiving a wireless signal from the antenna; generating a feedback current according to a part of the carrier signal, and feeding the feedback current to an input of a receiver; and adjusting the feedback current according to a signal strength of noises in the wireless signal to cancel the noises in the wireless signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
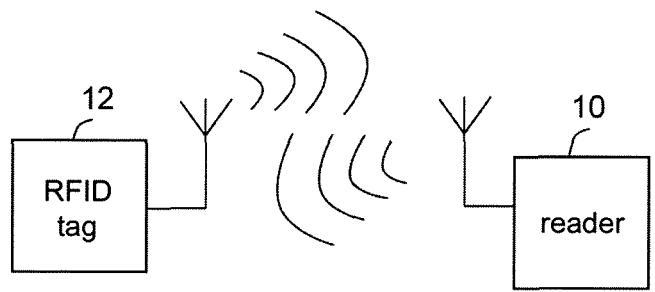
FIG. 1 is a conventional RFID system.
Figure 2:
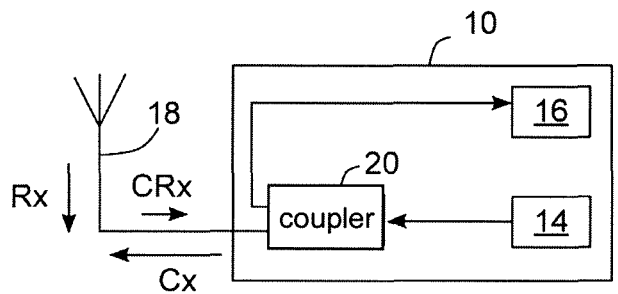
FIG. 2 is a structure of a reader in FIG. 1
Figure 3:
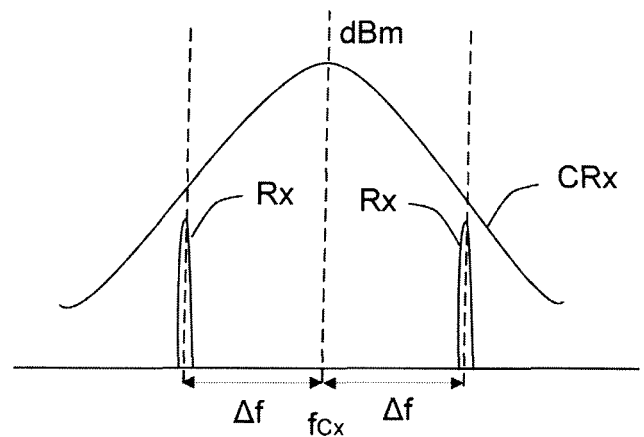
FIG. 3 is a spectrum of a reflected carrier signal CRx and a wireless signal Rx.
Figure 4:
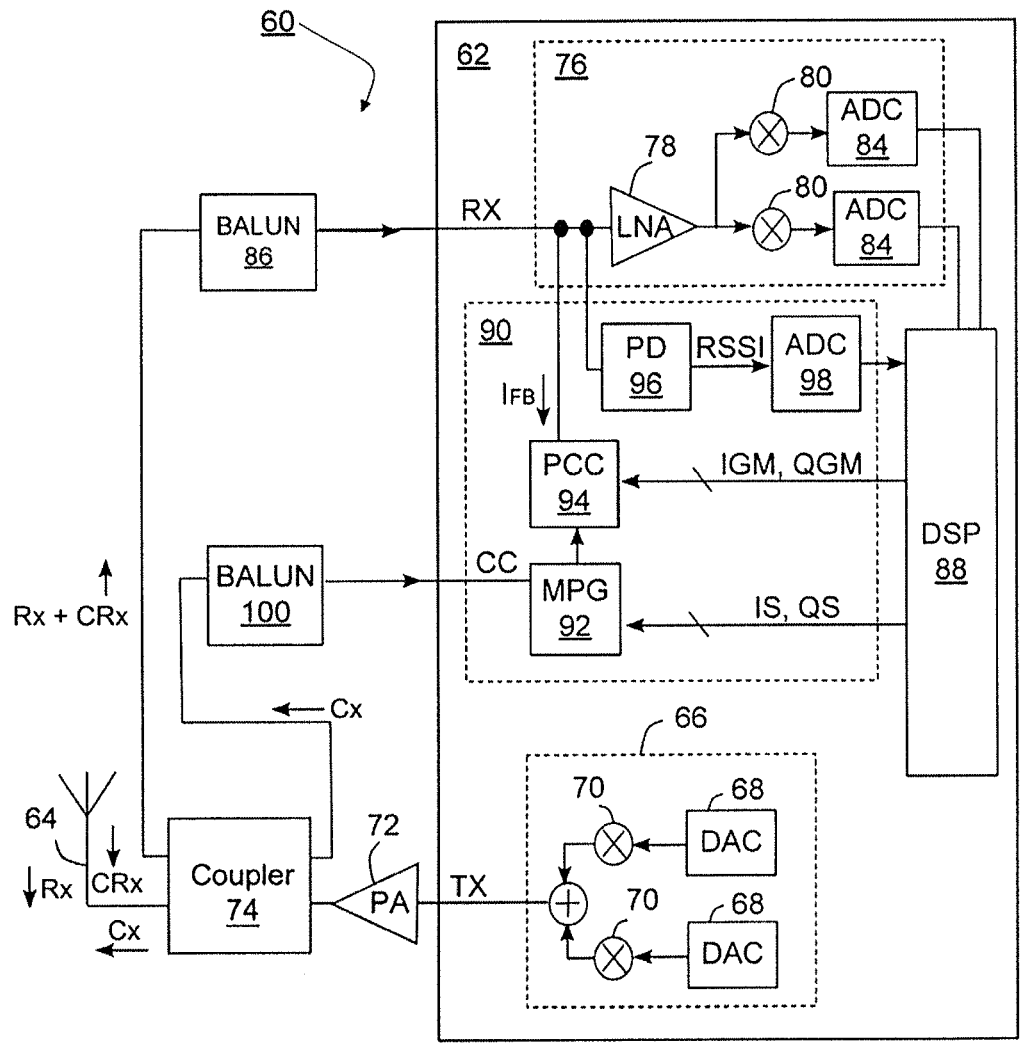
FIG. 4 is a block diagram of a transceiver for RFID according to an embodiment of the present invention.

FIG. 4 shows a block diagram of an RFID transceiver. Referring to FIG. 4, a transceiver 60 includes a reader 62, an antenna 64, and several discrete elements.

A digital message to be transmitted by the reader 62 is converted by a digital-to-analog converter (DAC) 68 and up-converted by a mixer 70, and is transmitted to the environment by the transmitter 66 via a transmitting terminal Tx, a power amplifier 72, a coupler 74 and the antenna 64. The mixer 70 mixes the modulated signal outputted by the DAC 68 and a carrier signal provided by a local oscillator.

A receiver 76 includes a low-noise amplifier (LNA) 78, a mixer 80 and an analog-to-digital converter (ADC) 84. The wireless signal transmitted by the RFID tag and received by the antenna 64 is processed by the coupler 74, a balanced and unbalanced converter (balun) 86 and a receiving terminal RX, and is then received by the receiver 76. After processes of down-conversion and analog-to-digital conversion, the receiver 76 provides a corresponding digital signal to a digital signal processor 88.

As the transmitter 66 transits via the transmitting terminal TX, the power amplifier 72, a coupler 74 and the antenna 64, a part of the carrier signal Cx is reflected by the antenna 64 as the reflected carrier signal CRx. As far as wireless signals from the RFID tag are concerned, the reflected carrier signal CRx is noises that should be restrained or eliminated. Without appropriate processing, noises such as the reflected carrier signal CRx are included in the wireless signal, and are received by the receiver 76 via the coupler 74, the balun 86 and the receiving terminal RX.

The reader 62 further includes a noise canceller 90 for eliminating or restraining the noises (i.e., the reflected carrier signal CRx) included in the wireless signal received by the receiving terminal RX to increase the signal-to-noise ratio. The noise canceller 90 includes a multiphase generator 92, a programmable current generator 94, a power detector 96 and an ADC 98.

Figure 5:
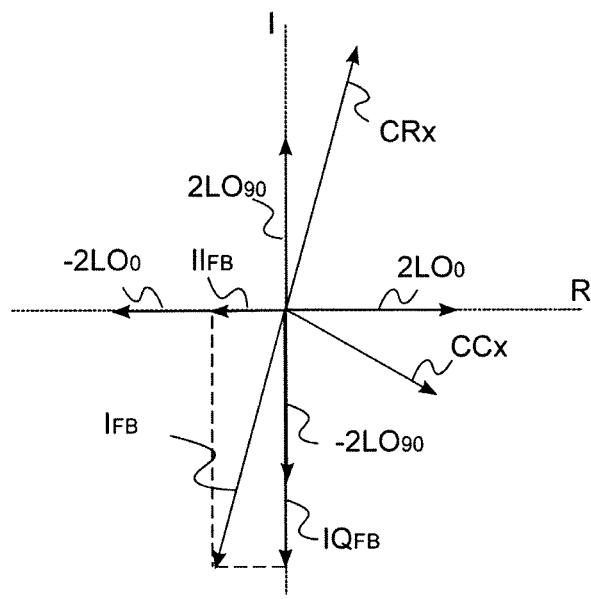
FIG. 5 is an example of relations of phases and strengths of associated signals in FIG. 4.

A part of the carrier signal Cx passes through the coupler 74 and a balun 100 to reach a carrier cancelling terminal CC, and becomes a carrier cancelling signal CCx. Since the carrier cancelling signal CCx and the reflected carrier signal CRx are both a part of the carrier signal but pass through different transmission paths, the carrier cancelling signal CCx and the reflected carrier signal CRx only differ in signal phase and signal strength. FIG. 5 shows examples relations of phases and signal strengths of associated signal in FIG. 4. In FIG. 5, assume that the carrier cancelling signal CCx is located in the fourth quadrant, and the reflected carrier signal CRx is located in the first quadrant.

On basis of the carrier cancelling signal CCx, the multiphase generator 92 provides one pair of multiple pairs of basic signals. Taking FIG. 5 for example, the multiphase generator 92 generates basic signal pairs ($2LO_0$, $2LO_{90}$), ($-2LO_0$, $2LO_{90}$), ($-2LO_0$, $-2LO_{90}$) and ($2LO_0$, $-2LO_{90}$), which are respectively located at borders of the first, second, third and fourth quadrants in FIG. 5. The basic signal $2LO_0$ is a first basic signal behind the carrier cancelling signal CCx by $\pi/2$ radians, and so forth. The four pairs of basic signals represent four phase relations with the carrier cancelling signal CCx. According to polarity signals IS and QS, the multiphase generator 92 selects one pair from the four pairs of basic signals and outputs the selected pair to the programmable current generator 94. For example, at a particular time point, the digital signal processor 88 provides logic 1 polarity signals IS and QS to the multiphase generator 92, which then accordingly provides the basic signal pair ($-2LO_0$, $-2LO_{90}$) to the programmable current generator 94.

In one embodiment, the programmable current generator 94 is a transconductor. According to amplification ratios $g_{mI}$ and $g_{mQ}$, the transconductor converts the received basic signal pair to corresponding compensation currents $II_{FB}$ and $IQ_{FB}$ to be consolidated into a feedback current $I_{FB}$, and feeds the feedback current $I_{FB}$ to the input of the receiver 76, i.e., the receiving terminal RX. The digital signal processor 88 provides amplification ratio control signals IGM and QGM for determining the amplification ratios $g_{mI}$ and $g_{mQ}$. Taking FIG. 5 for example, the programmable current generator 94 linearly converts the basic signal pair ($-2LO_0$, $-2LO_{90}$) to the corresponding compensation currents $II_{FB}$ and $IQ_{FB}$. The feedback current $I_{FB}$ is a vector sum of the compensation currents $II_{FB}$ and $IQ_{FB}$. In FIG. 5, the feedback current $I_{FB}$ is approximately a reverse of the reflected carrier signal CRx, meaning that the feedback current $I_{FB}$ is substantially cancels out the reflected carrier signal CRx to eliminate the noises.

A power detector 96 detects the signal strength of the noises in the wireless signal received by the receiving terminal RX, i.e., the strength of the reflected carrier signal CRx, to generate a received signal strength index (RSSI). According to the RSSI, the digital signal processor 88 updates the amplification ratio control signals IGM and QGM as well as the polarity signals IS and QS to accordingly adjust the feedback current $I_{FB}$. For example, the digital signal processor 88 is built in with an optimization algorithm for identifying optimal amplifier ratio control signals and polarity signals for rendering a lowest possible RSSI. For example, the digital signal processor 88 generates combinations of all possible amplification control signals IGM and QGM as well as the polarity signals IS and QS, generates all corresponding feedback currents $I_{FB}$, and records all corresponding RSSIs. Out of the corresponding RSSIs, the amplification control signals and the polarity signals corresponding to the smallest RSSI are the optimal amplification control signals and polarity signals, which are capable of substantially cancelling out the reflected carrier signal CRx considered as noises with the feedback current $I_{FB}$. Further, the digital signal processor 88 may record the optimal amplification ratio control signals and polarity signals for normal operations, so as to eliminate the reflected carrier signal CRx and to increase the signal-to-noise ratio at the receiving terminal RX.

Figure 6:
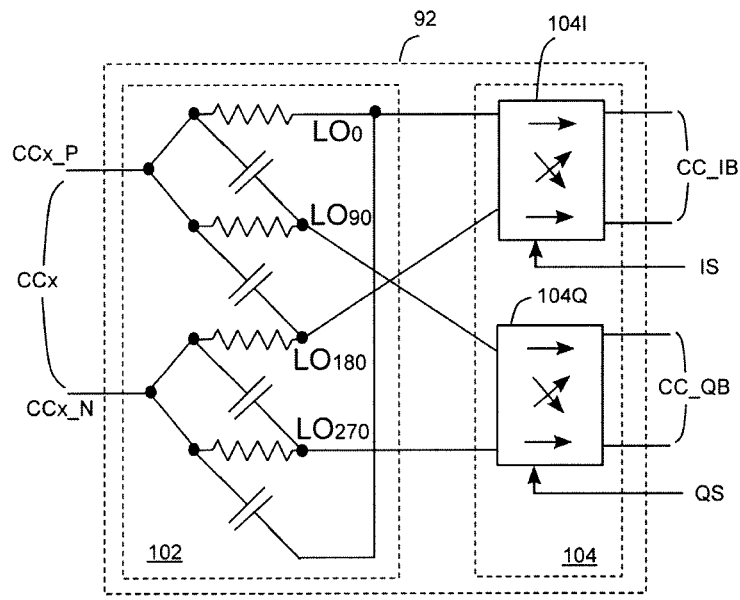
FIG. 6 is an exemplary multiphase generator.

FIG. 6 shows an exemplary multiphase generator 92 including a polyphase filter 102 and a polarity selector 104. On basis of the carrier cancelling signal CCx (consisted of balanced carrier cancelling signals CCx_P and CCx_N), the polyphase filter 102 generates four local oscillator signals $LO_0$, $LO_{90}$, $LO_{180}$ and $LO_{270}$, each falling behind a previous signal by $\pi/2$ radians. The polarity selector 104 includes two identical circuits 104I and 104Q. Taking the circuit 104I for illustration, when the polarity signal IS is 0, a basic signal CC_IB equals the local signal $LO_0$ subtracted by the local signal $LO_{180}$, and is thus $2*LO_0$. Conversely, when the polarity signal IS is 1, a basic signal CC_IB equals the local signal $LO_{180}$ subtracted by the local signal $LO_0$, and is thus $-2*LO_0$. Similarly, in this embodiment, the basic signal CC_QB equals $2*LO_{90}$ or $-2*LO_{90}$, depending on the polarity signal QS. Thus, according to the polarity signals IS and QS, the basic signal pair (CC_IB, CC_QB) provided by the multiphase generator 92 is one of the four basic signal pairs ($2LO_0$, $2LO_{90}$), ($-2LO_0$, $2LO_{90}$), ($-2LO_0$, $-LO_{90}$) and ($2LO_0$, $-2LO_{90}$). Despite that each basic signal pair appear as quadrature in the embodiment in FIG. 6, it should be noted that each of the basic signal pair may be non-quadrature in other embodiments.

Figure 7:
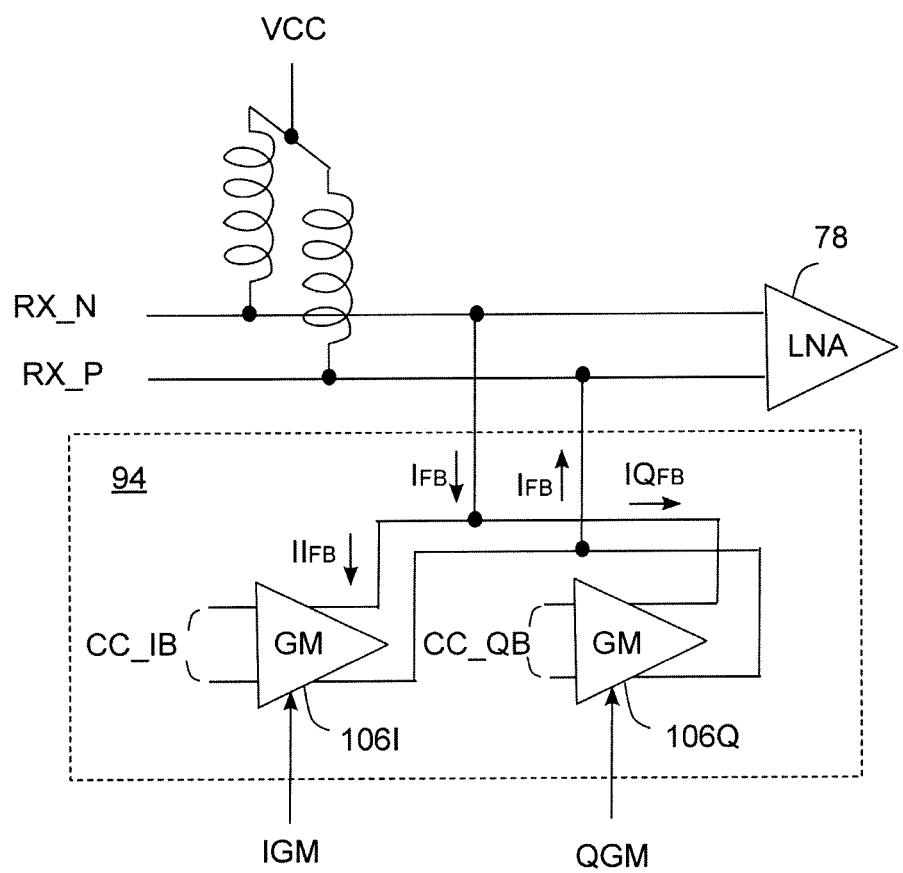
FIG. 7 is an exemplary programmable current generator.

FIG. 7 shows an exemplary current generator 94 including the same transconductors 106I and 106Q. Taking the transconductor 106I for example, the transconductor 106I receives the basic signal CC_IB to generate the compensation current $II_{FB}$, and the amplification ratio control signal IGM determines the amplification ratio $gm_I$ ($=II_{FB}/CC\_IB$). Similarly, the amplification ratio control signal QGM determines the amplification ratio $gm_Q$. The compensation currents $II_{FB}$ and $IQ_{FB}$ are consolidated into the feedback current that is fed to a positive end RX_P of the receiving terminal RX. In contrast, the feedback signal $II_{FB}$ is fed out of a negative end RX_N of the receiving terminal RX. The current can be fed in and fed out with a simple circuit arrangement of directly connecting wires from outputs of the transconductors 106I and 106Q to the receiving terminal RX.

It is observed from FIGS. 5, 6 and 7 that, from multiple phase relations, the polarity signals IS and QS select one phase relation of the basic signals corresponding to the carrier cancelling signal CCx to substantially determine in which quadrant in FIG. 5 the feedback current $I_{FB}$ is located. Further, in the quadrant selected by the polarity signals, the amplification ratio control signals IGM and QGM substantially determine the angle (phase) and the length (strength) of the feedback current $I_{FB}$. Thus, the digital signal processor 88 in FIG. 4 is capable of identifying the optimal amplification ratio control signals and polarity signals to render a lowest possible RSSI for allowing the feedback current $I_{FB}$ to substantially cancelling out the reflected carrier signal CRx.

It is also concluded from FIG. 4 that, regardless of whether the impedance of the antenna 64 is accurately matched, the digital signal processor 88 is capable of adaptively generating an appropriate feedback current $I_{FB}$ for cancelling out the possible reflected carrier signal CRx.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transceiver for radio-frequency identification (RFID), comprising:
a transmitter, for transmitting a carrier signal to an antenna;
a receiver, having an input terminal, for receiving a wireless signal from the antenna through the input terminal; and
a noise canceller, for generating a feedback current according to a part of the carrier signal, feeding the feedback current to the input terminal of the receiver, and adjusting the feedback current according to a signal strength of a noise in the wireless signal to eliminate the noise in the wireless signal,
wherein the noise canceller comprises:
a multiphase generator, for generating a pair of basic signals having a predetermined phase relation according to the part of the carrier signal; wherein the predetermined phase relation is one of a plurality of phase relations; and
a programmable current generator, for generating the feedback current according to the pair of basic signals, and feeding the feedback signal to the input terminal of the receiver.

2. The transceiver according to claim 1, wherein the multiphase generator comprises:
a polyphase filter, for generating a plurality of polyphase local signals on basis of the part of the carrier signal; and
a selector, for utilizing a difference between two local signals of the polyphase local signals as one of the two basic signals, and utilizing a difference between two other local signals of the polyphase local signals as one other of the two basic signals.

3. The transceiver according to claim 1, wherein the programmable current generator respectively converts the pair of basic signals to a pair of compensation currents by two amplification ratios, feeds the pair of compensation currents to the input terminal, and determines the two amplification ratios according to two amplification ratio control signals received.

4. The transceiver according to claim 1, wherein a phase difference between the pair of basic signals is substantially $\pi/2$ radians.

5. The transceiver according to claim 1, further comprising:
a digital signal processor, for providing an optimization algorithm for controlling the noise canceller to minimize the noise in the wireless signal.

6. The transceiver according to claim 5, wherein the digital signal processor records amplification ratio control signals and polarity signals obtained by the optimization algorithm for use of normal operations.

7. A noise cancellation method, applied to an RIFD transceiver coupled to an antenna, comprising:
transmitting a carrier signal to the antenna;
receiving a wireless signal from the antenna;
generating a feedback current according to a part of the carrier signal;
adjusting the feedback current according to a signal strength of a noise in the wireless signal to eliminate the noise in the wireless signal;
providing a plurality of phase relations;
generating a pair of basic signals according to the part of the carrier signal; wherein the pair of basic signals match one of the phase relations; and
generating the feedback current according to the pair of basic signals, and feeding the feedback signal to the input terminal of the receiver.

8. The method according to claim 7, comprising:
generating a plurality of polyphase local signals according to the part of the carrier signal;
utilizing a difference between two local signals of the polyphase local signals as one of the two basic signals; and
utilizing a difference between two other local signals of the polyphase local signals as one other of the two basic signals.

9. The method according to claim 7, comprising:
providing two polarity signals for selecting one of the phase relations.

10. The method according to claim 7, comprising:
generating a pair of basic signals according to the part of the carrier signal; and
converting the pair of basic signals to a pair of compensation currents, and feeding the compensation currents to the input terminal of the receiver.

11. The method according to claim 10, comprising:
providing two amplification ratios for converting the pair of basic signal into the pair of compensation currents; and
optimizing the amplification ratios according to an optimization algorithm to minimize the noise in the wireless signal.

12. The method according to claim 11, comprising:
recording the amplification ratio control signals and the polarity signals obtained by the optimization algorithm for use of normal operations.

13. A transceiver for radio-frequency identification (RFID), comprising:
a transmitter, for transmitting a carrier signal to an antenna;
a receiver, having an input terminal, for receiving a wireless signal from the antenna through the input terminal;
a noise canceller, for generating a feedback current according to a part of the carrier signal, feeding the feedback current to the input terminal of the receiver, and adjusting the feedback current according to a signal strength of a noise in the wireless signal to eliminate the noise in the wireless signal; and
a digital signal processor, for providing an optimization algorithm for controlling the noise canceller to minimize the noise in the wireless signal,
wherein the digital signal processor records amplification ratio control signals and polarity signals obtained by the optimization algorithm for use of normal operations.

* * * * *